(12) United States Patent
Oda

(10) Patent No.: US 7,656,390 B2
(45) Date of Patent: Feb. 2, 2010

(54) POSITION DETECTING DEVICE

(75) Inventor: Yasuo Oda, Kuki (JP)

(73) Assignee: WACOM Co., Ltd., Saitama-Ken (JP)

( * ) Notice: Subject to any disclaimer, the term of this patent is extended or adjusted under 35 U.S.C. 154(b) by 633 days.

(21) Appl. No.: 11/246,959

(22) Filed: Oct. 11, 2005

(65) Prior Publication Data

US 2006/0087422 A1 Apr. 27, 2006

(30) Foreign Application Priority Data

Oct. 12, 2004 (JP) .............................. 2004-297159

(51) Int. Cl.
*G06F 3/041* (2006.01)
(52) U.S. Cl. .................................... 345/173; 178/18.01
(58) Field of Classification Search ......... 345/173–178; 178/18.03–18.071
See application file for complete search history.

(56) References Cited

U.S. PATENT DOCUMENTS 5,466,896 A    11/1995   Murakami et al.
5,657,011 A *   8/1997   Komatsu et al. ................ 341/5
5,675,130 A *  10/1997   Sekizawa ................. 178/18.07
6,810,351 B2   10/2004   Katsurahira
6,930,674 B2    8/2005   Katsurahira

FOREIGN PATENT DOCUMENTS

EP        0 740 265 A2    10/1996
JP        03-147012        6/1991
JP        06-075683        3/1994
JP        08-286815       11/1996

* cited by examiner

*Primary Examiner*—Amr Awad
*Assistant Examiner*—Randal Willis
(74) *Attorney, Agent, or Firm*—Berenato & White

(57) ABSTRACT

A position detecting device selects sensors arranged in the order of sensor 1, 2, 3, 4, 5, and 6 in an X-axis direction and a Y-axis direction. In a first selection pattern, the device selects a sensor in the order of sensor 1, 6, 2, 5, 3, and 4. In a second pattern, the device selects a sensor in the order of sensor 1, 6, 5, 2, 3, and 4. In a third pattern, the device selects a sensor in the order of sensor 1, 6, 2, 5, 4, and 3. In a fourth pattern, the device selects a sensor in the order of sensor 1, 6, 5, 2, 3, and 4. By selecting the sensors 1 to 6 in an order different from the order of the arrangement and communicating signals with a position pointer, the device detects the position pointed by the position pointer.

21 Claims, 8 Drawing Sheets

POSITION DETECTING DEVICE

CROSS-REFERENCE TO RELATED APPLICATIONS AND CLAIM TO PRIORITY

This application is based upon application number 2004-297159, filed Oct. 12, 2004, in Japan, the disclosure of which is incorporated by reference and to which priority is claimed.

BACKGROUND OF THE INVENTION

The present invention relates to a position detecting device that detects a position pointed by a position pointer using electromagnetic coupling and that is used for an input device of, for example, a computer aided design (CAD) terminal, a computer, a personal digital assistant (PDA), a cell phone, and a personal handyphone system (PHS).

Position detection devices have been used which receive an electromagnetic coupling signal from a position pointer for pointing a position so as to detect a position pointed by the position pointer and which are used for an input device of, for example, a CAD terminal, a computer, a PDA, and a cell phone.

FIG. 6 is a timing diagram of a known position detecting device in which sensor coils are arranged in an XY matrix. As shown in FIG. 6, if the known position detecting device has already recognized a position pointed by a position pointer, a predetermined number of X-axis direction sensor coils and a predetermined number of Y-axis direction sensor coils arranged in the vicinity of a position pointed by the position pointer (sensor coils 1 to 6 in FIG. 6) are alternatively scanned in a direction in which the sensors are arranged (i.e., a direction from the sensor coil 1 to the sensor coil 6) so that each of the sensor coils and the position pointer communicate signals. Thus, the position detecting device detects the position pointing signals from the position pointer and computes the position pointed by the position pointer using, for example, parabolic approximation.

At that time, as shown in FIG. 7, each sensor coil transmits a detecting signal to the position pointer and receives a position pointing signal from the position pointer several times (four times in an example shown in FIG. 7) to compute the position pointed by the position pointer by using the sum or average value of signal levels obtained from the receiving operations.

However, a position detecting device used at a position very close to the body of an electronic apparatus, such as a computer and a PDA, has a disadvantage in that a significant error occurs when detecting a position pointed by a position pointer due to electromagnetic noise which is generated by the body of the electronic apparatus and which influences a signal received from the position pointer using electromagnetic coupling.

For example, in a position detecting device used as an input device of an electronic apparatus such as a PDA or a cell phone, noise in a driving signal of a liquid crystal display (LCD) incorporated in the body of the electronic apparatus (for example, noise in a display driving signal or in a backlight inverter) disadvantageously causes a significant detection error.

In particular, when, as shown in FIG. 6, a scanning frequency of the sensor coils in the position detecting device is close to a frequency of noise from the body of the electronic apparatus, that is, when the difference between both frequencies is small, low-frequency jitter is generated, since the sensor coils are scanned in the order in which the sensor coils are arranged. Thus, it is difficult to eliminate the influence of the noise. Consequently, the detected position may vary and a significant error may occur. Alternatively, the level of a signal detected by a specific sensor coil may be high, and therefore, the signal is detected as if the position of the position pointer is displaced. Thus, a detection error becomes large, which is a problem.

FIG. 8 illustrates a frequency characteristic of jitter when an electromagnetic coupling signal received by a position pointing device from a position pointer is affected by noise generated by an LCD in an electronic apparatus. As shown in FIG. 8, when the unit interval of a sensor-coil scanning frequency is a reciprocal number 1/Ts of scanning time Ts for scanning two coils of the position detecting device (or one coil depending on a computing method of the coordinates of the position detecting device), a large low-frequency jitter occurs for noise at positions of a frequency distant from a sensor-coil scanning frequency f0 by ±0.5 frequencies, that is, at positions of f0±0.5/Ts. Accordingly, a large detection error disadvantageously occurs due to the noise.

SUMMARY OF THE INVENTION

Accordingly, the present invention provides a position detecting device for reducing a detection error due to the influence of noise.

According to an embodiment of the present invention, a position detecting device includes a position pointer, a plurality of sensors arranged in a direction of detecting a position, reception device for receiving a position pointed by the position pointer using the sensors via electromagnetic coupling or electrostatic coupling, and detection device for detecting the position pointed by the position pointer from the received signal. The reception device extracts a predetermined number of sensors from among the plurality of sensors to form each of a plurality of groups and defines a unique order of selecting a sensor to be scanned for each group, and the order of selecting a sensor in a group to be scanned is different from that in the immediately previously scanned group.

According to an embodiment of the present invention, a position detecting device includes a plurality of sensors arranged in a predetermined order for receiving a signal from a position pointer; reception device for extracting a predetermined number of plural sensors from among the plurality of sensors to form each of a plurality of groups and receiving the signal from the position pointer using the sensors selected in a predetermined order from among the sensors in the group via electromagnetic coupling or electrostatic coupling; and detection device for detecting a position pointed by the position pointer on the basis of the signals received by the selected sensors. The reception device sequentially forms a plurality of groups in which an order of selecting the extracted sensors is different from each other and receives the signal from the position pointer for each group using the sensors selected according to the order defined for each group via electromagnetic coupling or electrostatic coupling. The detection device detects a position pointed by the position pointer on the basis of the signals received by the selected sensors.

The reception device can select the sensors located at either side of the remaining sensors in each group prior to each of the middle sensors located between the two end sensors and receives a signal from the position pointer via electromagnetic coupling or electrostatic coupling.

In addition, the reception device can change an order of selecting each of the middle sensors in each group in a predetermined manner so that the order of selecting the sensor is different for each group and receives a signal from the position pointer using the selected sensor via electromagnetic coupling or electrostatic coupling.

Additionally, the reception device can repeat a cycle of a set formed from a plurality of the groups each having a different order of selecting a sensor in the group.

Furthermore, the detection device can detect tentative positions pointed by the position pointer on the basis of signals received by the sensors in each group and can determine the moving average of a predetermined number of the tentative positions to be the position pointed by the position pointer.

The position detecting device can further include transmission device for delivering a position detecting signal to the sensors so as to cause the sensors to transmit a position detecting signal for detecting a position pointed by the position pointer to the position pointer via electromagnetic coupling or electrostatic coupling. The transmission device can select the same sensor as a reception sensor selected by the reception device and delivers the position detecting signal to the selected sensor.

Furthermore, the position detecting device can further include transmission device for delivering a position detecting signal to the sensor so as to cause the sensor to transmit a position detecting signal for detecting a position pointed by the position pointer to the position pointer via electromagnetic coupling or electrostatic coupling. The transmission device can select the sensor located at a position closest to the position pointer in each group and delivers the position detecting signal to the selected sensor.

According to an embodiment of the present invention, a position detecting device includes a position pointer, a plurality of transmission units arranged in a direction of detecting a position, transmission device for transmitting a position pointed by the position pointer using the transmission units via electromagnetic coupling or electrostatic coupling, reception device for receiving signals transmitted from the transmission units, and detection device for detecting the position pointed by the position pointer from the received signal. The transmission device extracts a predetermined number of transmission units from among the plurality of transmission units in an order of the arrangement thereof to form each of a plurality of groups and defines a unique order of selecting a transmission unit to be scanned for each group and wherein the order of selecting the transmission units in a group to be scanned is different from that in the immediately previously scanned group.

According to an embodiment of the present invention, a position detecting device includes a plurality of transmission units arranged in a predetermined order for transmitting a position detecting signal to a position pointer using electromagnetic coupling or electrostatic coupling; transmission device for extracting a predetermined number of plural transmission units in the order of arrangement from among the plurality of transmission units to form each of a plurality of groups and delivering a position detecting signal to the transmission unit selected in a predetermined order from among the transmission units in each group in order to transmit the position detection signal to the position pointer; reception device for receiving a position pointing signal from the position pointer using electromagnetic coupling or electrostatic coupling; and detection device for detecting a position pointed by the position pointer on the basis of the signal received by the reception device. The transmission device sequentially forms a plurality of groups in which an order of selecting the extracted transmission units is different from each other and delivers the position detecting signal to the transmission unit in each group selected according to the order defined for each group.

The transmission device can select the transmission units located at either side of the remaining transmission units in each group prior to each of the middle transmission units located between the two end transmission units and delivers the position detecting signal.

Additionally, the transmission device can change an order of selecting each of the middle transmission units in each group in a predetermined manner so that the order of selecting the transmission unit is different for each group and delivers the position detecting signal to the selected transmission unit.

Furthermore, the transmission device can repeat a cycle of a set formed from a plurality of the groups each having a different order of selecting a transmission unit in the group.

Furthermore, the detection device can detect tentative positions pointed by the position pointer on the basis of signals from the position pointer in response to position detecting signals transmitted from the transmission units in each group and can determine the moving average of a predetermined number of the tentative positions to be the position pointed by the position pointer.

Still furthermore, the reception device can select the transmission unit located at a position closest to the position pointer in each group and receives the position pointing signal from the position pointer using the selected transmission unit.

According to an embodiment of the present invention, a position detecting device includes a position pointer, a plurality of sensors arranged in a direction of detecting a position, reception device for receiving a position pointed by the position pointer using the sensors via electromagnetic coupling or electrostatic coupling, and detection device for detecting the position pointed by the position pointer from the received signal. The reception device selects the sensors to be scanned from among the plurality of sensors in a predetermined order and the order of selecting the sensors is different from that of the immediately previously scanned sensors.

According to the present invention, a detection error caused by noise generated by a body of an electronic apparatus can be reduced.

DETAILED DESCRIPTION OF THE PREFERRED EMBODIMENT(S)

Position detection devices according to embodiments of the present invention are described below with reference to the accompanying drawings.

Figure 1:
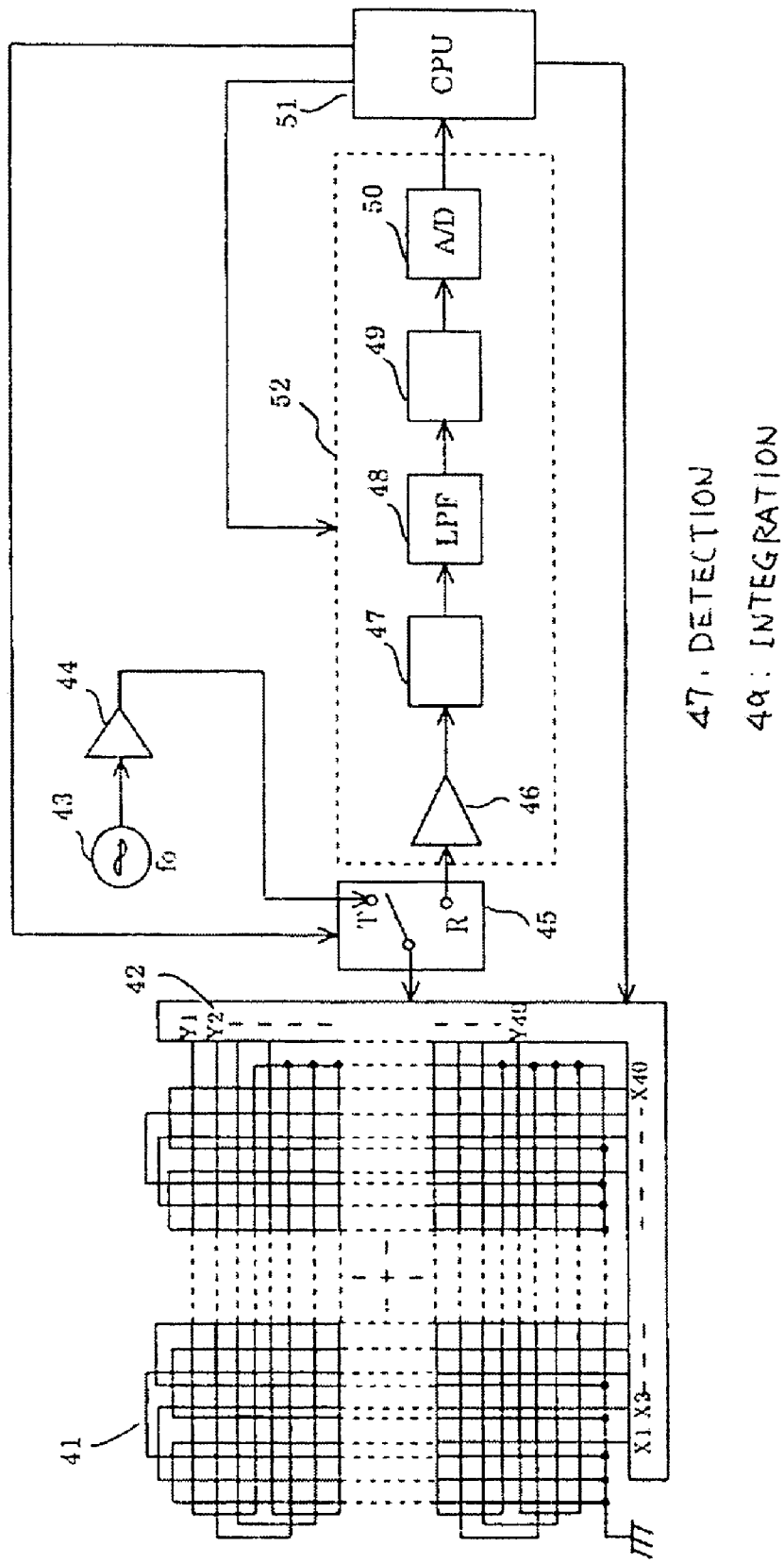
FIG. 1 is a block diagram of a position detecting device according to an embodiment of the present invention.

FIG. 1 illustrates a block diagram of a position detecting device according to a first embodiment of the present invention. Although not shown in FIG. 1, a position pointer, which is a component of a position detection system including the position detection device, includes at least one coil which forms a resonant circuit together with a capacitor. A resonance frequency f0 of the resonant circuit is designed so that it is substantially the same as the frequency of a signal communicated between the position pointer and the position detecting device.

As shown in FIG. 1, a sensor coil (loop sensor) set 41 includes X-axis direction sensor coils X1 to X40 and Y-axis direction sensor coils Y1 to Y40 arranged in an X-axis direction and a Y-axis direction, respectively. The sensor coil set 41 serves as sensor device. Each sensor coil serves as a sensor. The plurality of sensor coils X1 to X40 and Y1 to Y40 is connected to a selection circuit 42 for selecting each sensor coil.

An oscillator circuit 43 oscillates at a frequency of f0 which is substantially the same as the resonance frequency of the position pointer. The oscillator circuit 43 is connected to a transmission terminal T of a transmission/reception switching circuit 45 via a current driver 44. A common terminal of the transmission/reception switching circuit 45 is connected to the selection circuit 42. A sensor coil selected by the selection circuit 42 transmits electromagnetic waves of a frequency f0 to the position pointer.

A reception terminal R of the transmission/reception switching circuit 45 is connected to an amplifier circuit 46, which is connected to a detector circuit 47. The detector circuit 47 is connected to a low-pass filter (LPF) 48. The low-pass filter 48 is connected to an integration amplifier 49, which holds a reception signal for a predetermined time period. The analog voltage held by the integration amplifier 49 is converted to a digital signal by an analog-to-digital (A/D) converter circuit 50. The output from the A/D converter circuit 50 is delivered to a central processing unit (CPU) 51.

A level detection circuit 52 includes the amplifier circuit 46, the detector circuit 47, the low-pass filter 48, the integration amplifier 49, and the A/D converter circuit 50.

The CPU 51 also serves as control device. The CPU 51 controls the selection circuit 42 to select a predetermined sensor coil from the sensor coil set 41. The CPU 51 also controls switching of transmission and reception of the transmission/reception switching circuit 45. In addition, the CPU 51 controls the level detection circuit 52.

The selection circuit 42, the oscillator circuit 43, the current driver 44, the transmission/reception switching circuit 45, and the CPU 51 together serve as transmission device for transmitting a position detecting signal used for detecting the position of the position pointer to the position pointer using electromagnetic coupling.

The selection circuit 42, the transmission/reception switching circuit 45, and the CPU 51 together serve as reception device for receiving a position pointing signal from the position pointer using electromagnetic coupling. The level detection circuit 52 and the CPU 51 serve as detection device for detecting a position pointed by the position pointer on the basis of a position pointing signal from the position pointer received by the reception device.

Figure 2:
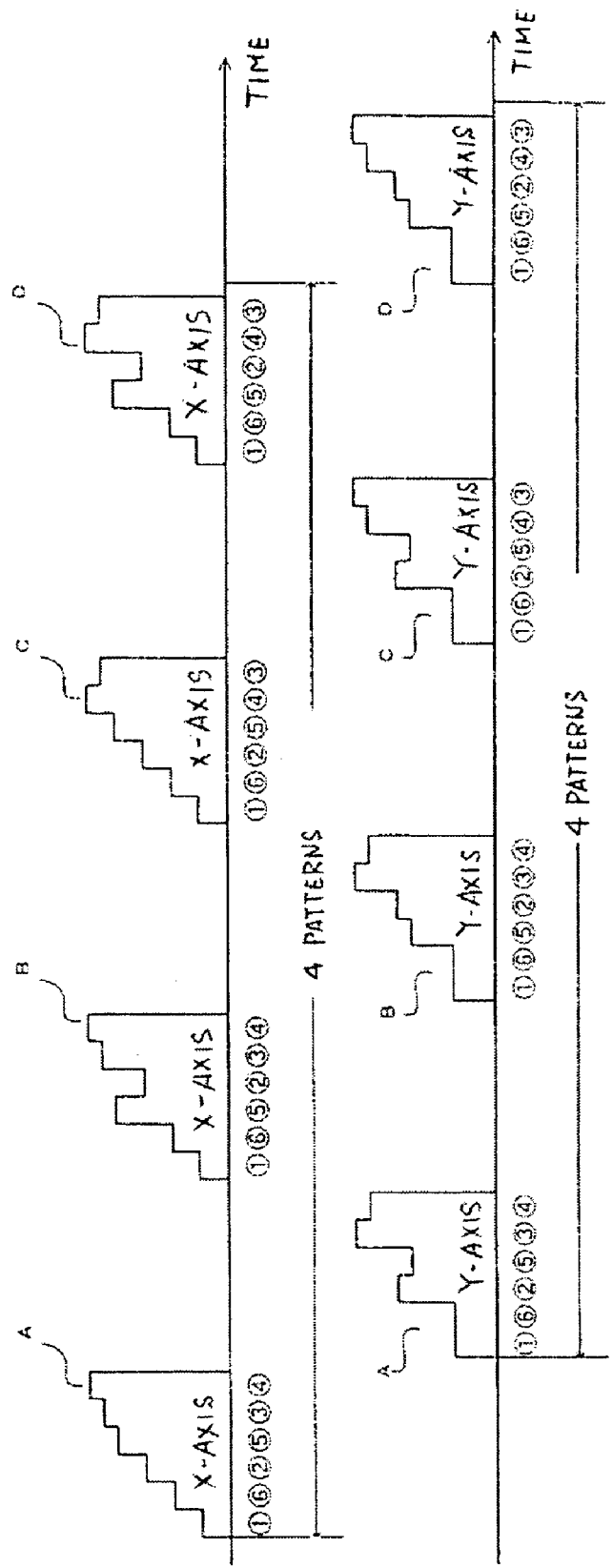
FIG. 2 is a timing diagram illustrating the operation of the position detecting device according to the embodiment of the present invention.
Figure 3:
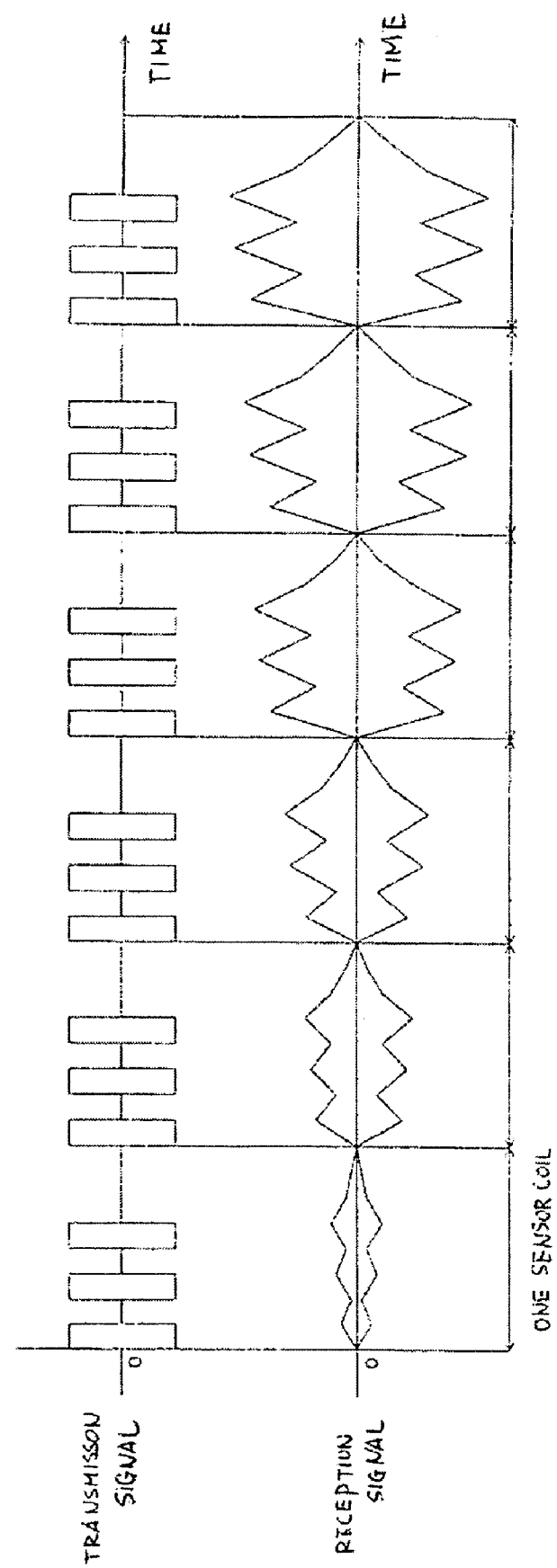
FIG. 3 is a timing diagram illustrating the operation of the position detecting device according to the embodiment of the present invention.

FIG. 2 is a timing diagram illustrating the operation of the position detecting device according to the first embodiment of the present invention. FIG. 3 is a timing diagram illustrating the operation of the position detecting device when selecting and driving each sensor coil according to the first embodiment of the present invention.

Figure 4:
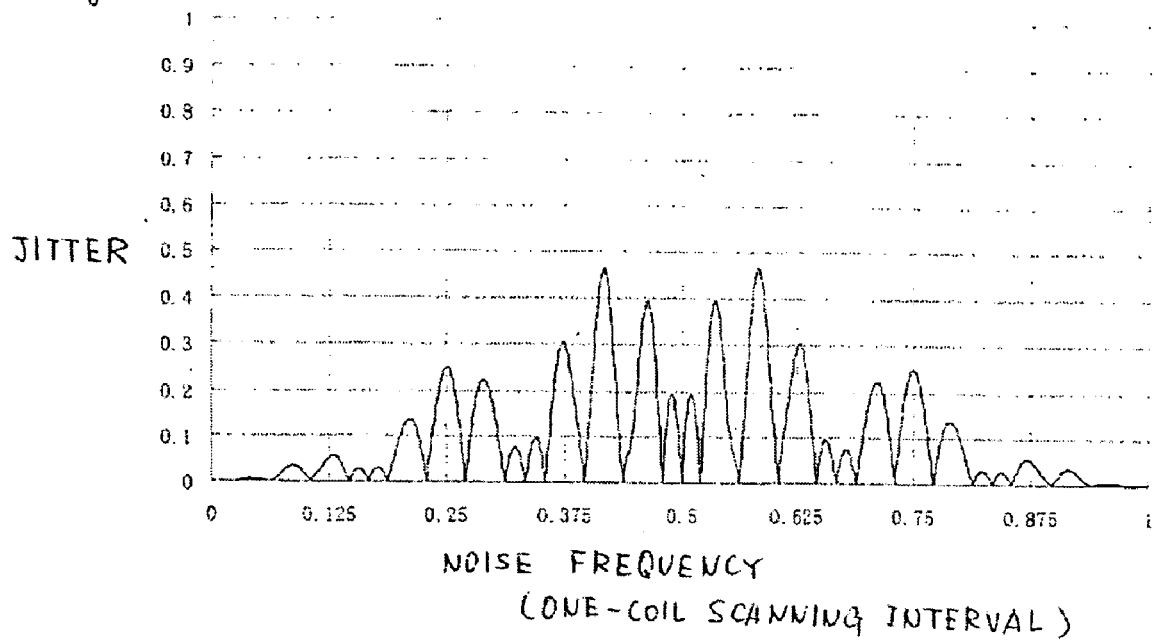
FIG. 4 is a graph illustrating a noise frequency characteristic of the position detecting device according to the embodiment of the present invention.

FIG. 4 illustrates a frequency characteristic of jitter when a signal received by the position detecting device from the position pointer using electromagnetic coupling is influenced by noise generated by an LCD of an electronic apparatus. FIG. 4 is a characteristic diagram corresponding to FIG. 8.

Figure 5:
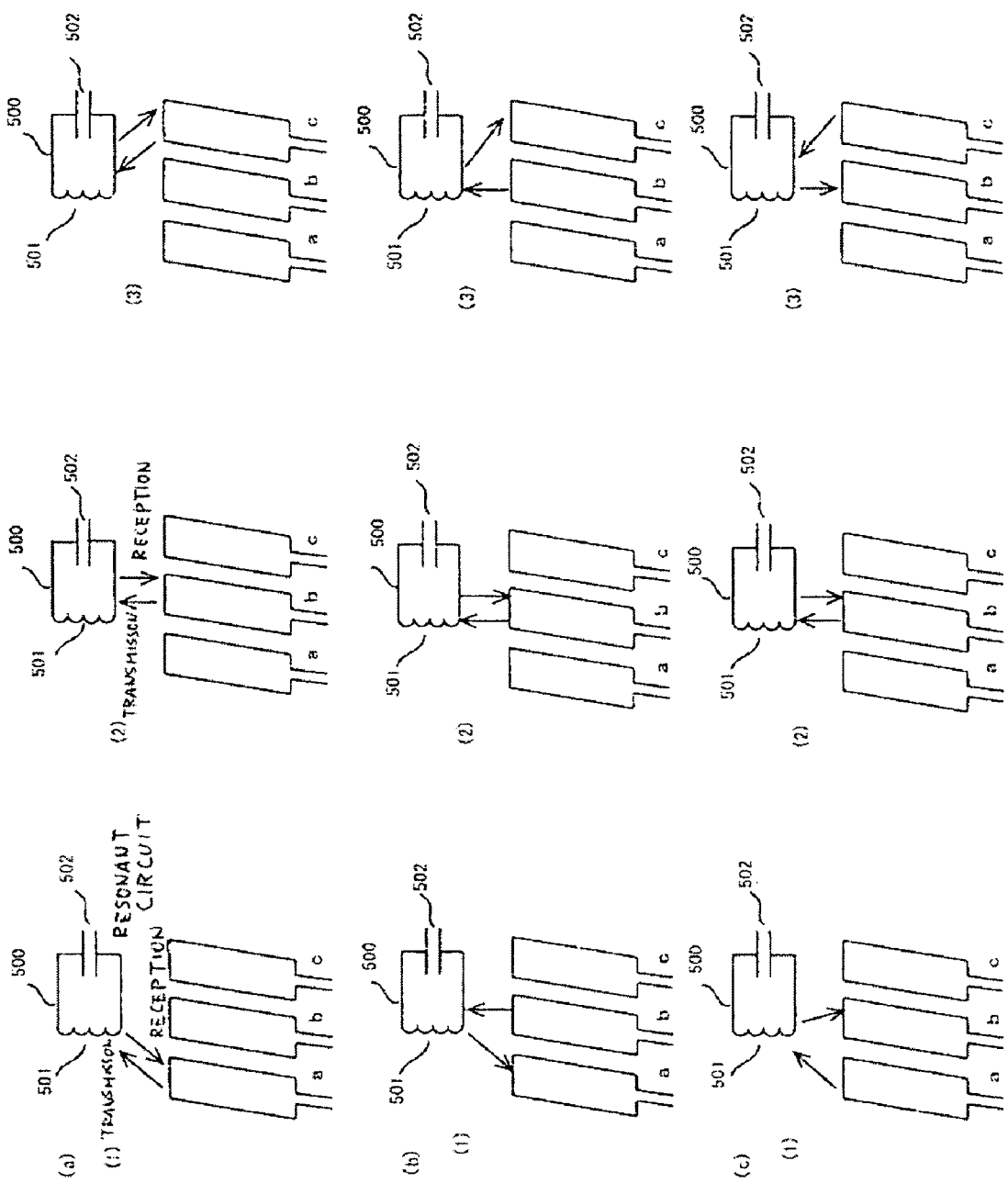
FIGS. 5A-5C are diagrams for schematically illustrating the operation of a position detecting device according to an embodiment of the present invention.

FIG. 5A is a diagram for schematically illustrating the operation of the position detecting device according to the first embodiment of the present invention. The operation of the position detecting device is schematically described below with reference to FIG. 5A. The position detecting device according to the first embodiment of the present invention includes a plurality of sensor coils a to c, which is grouped into one, and a position pointer 500 including a resonant circuit composed of a coil 501 and a capacitor 502. The sensor coils a to c transmit position detecting signals to the position pointer 500 using electromagnetic coupling in a predetermined order. The sensor coils a to c, which transmit the position detecting signals, also receives position pointing signals from the position pointer 500 (see (1) to (3) shown in FIG. 5A). Thus, the position detecting device can detect the position pointed by the position pointer 500 on the basis of the received signals.

The operation of the position detecting device according to this embodiment is described in detail below with reference to FIGS. 1 through 4 and FIGS. 5A through 5C. When the position detecting device is powered on or when the position detecting device cannot recognize the position pointed by the position pointer 500, the position detecting device operates in a mode in which it scans all of the X-axis direction sensors X1 to X40 and/or Y-axis direction sensors Y1 to Y40 to detect the position pointed by the position pointer 500 (global scanning mode). In contrast, when the position detecting device has already known the position pointed by the position pointer 500, the position detecting device operates in a mode in which it scans only a predetermined number of X-axis direction sensors and Y-axis direction sensors to detect the position pointed by the position pointer 500 (sector scanning mode). In the following description, the selection pattern of the sensor coils in the sector scanning mode is used. However, this description can be applied to the global scanning mode.

When the position detecting device detects the position pointed by the position pointer 500 (e.g., the position of the position pointer 500 itself), the CPU 51 controls the transmission/reception switching circuit 45 to alternately switch, at a predetermined time interval, between a transmission mode (connection between the common terminal and the transmission terminal T) and a reception mode (connection between the common terminal and the reception terminal R) so as to detect the position pointed by the position pointer 500.

That is, in the transmission mode, a signal from the oscillator circuit 43 is transmitted as a position detecting signal from a sensor coil selected by the selection circuit 42 to the position pointer 500 using an alternating magnetic field. The resonant circuit of the position pointer 500 receives the position detecting signal using electromagnetic coupling and returns an alternating magnetic field functioning as a position pointing signal.

Subsequently, the CPU 51 changes the transmission/reception switching circuit 45 to a reception mode so that the sensor coil that transmitted the position detecting signal receives the position pointing signal from the position pointer 500 using electromagnetic coupling. The level detection circuit 52 then detects the signal level of the received position pointing signal.

In the transmission mode and the reception mode, a sensor coil is selected in the order shown in FIG. 2 by the selection circuit 42 under the control of the CPU 51.

As shown in FIG. 2, a predetermined number of sensor coils (six in this embodiment) are extracted in the order of arrangement thereof from among the pluralities of sensor coils X1 to X40 and Y1 to Y40 of the sensor coil set 41 into a group (sensor coils 1 to 6 in FIG. 2). Each of the sensor coils 1 to 6 is sequentially selected in a predetermined order. A detecting signal is delivered to the selected one of the sensor coils 1 to 6, which transmits the detecting signal to the position pointer 500. The selected one of the sensor coils 1 to 6 also receives a signal from the position pointer 500 using electromagnetic coupling. At that time, each of the sensor coils 1 to 6 of the group in the X-axis direction and Y-axis direction is sequentially selected in the predetermined order (selection pattern) that is different from the order of the arrangement thereof in order to transmit a detecting signal to the position-pointer 500 and to receive a position pointing signal from the position pointer 500 using electromagnetic coupling.

Additionally, as time elapses, a predetermined number of plural groups in which the order of selecting sensor coils are different from each other are sequentially formed. The set of the predetermined number of plural groups is repeated as one cycle.

The plurality of sensor coils in each group is the predetermined number of sensor coils in the vicinity of the position pointed by the position pointer 500. Accordingly, as the position pointer 500 moves, members of sensor coils in each group change. However, in the following descriptions, extracted sensor coils for each group are the same sensor coils 1 to 6 (i.e., the position pointer 500 hardly moves) for simplicity.

A plurality of selection patterns of the sensor coils 1 to 6 in each group is provided in each of X-axis direction and Y-axis direction (four patterns A to D in this embodiment). The plurality of selection patterns A to D forms one cycle. By repeating the cycle formed by the selection patterns A to D, the position pointed by the position pointer 500 is detected. As described below, each of the sensor coils 1 to 6 is scanned three times. The CPU 51 computes the position pointed by the position pointer 500 using the sum or average of the signal levels detected three times.

It is assumed that the sensor coils 1 to 6 in the group are arranged in the order of 1, 2, 3, 4, 5, and 6. In a selection pattern A for a first group, each of the sensor coils 1 and 6, which are located at either side of the remaining sensor coils 2 to 5 in the group, is selected in a predetermined order prior to the sensor coils 2 to 5, which are located between the sensor coils 1 and 6. For example, the sensor coil 1 is selected first, and subsequently the sensor coil 6 is selected. In a transmission mode, each of the selected sensor coils 1 and 6 transmits a detecting signal to the position pointer 500. In a reception mode, each of the selected sensor coils 1 and 6, which transmitted the detecting signal in the transmission mode, receives a position pointing signal from the position pointer 500 using electromagnetic coupling.

In the subsequent operation for selecting a sensor coil, each of the sensor coils 2 and 5, which are located at either side of the sensor coils between the sensor coils 1 and 6, is selected in a predetermined order. For example, the sensor coil 2 is selected first, and subsequently the sensor coil 5 is selected. Each of the selected sensor coils 2 and 5 carries out a detecting signal transmitting operation and a position pointing signal receiving operation in the same manner as described above.

In the subsequent operation for selecting a sensor coil, each of the sensor coils 3 and 4, which are located between the sensor coils 2 and 5, is selected in a predetermined order. For example, the sensor coil 3 is selected first, and subsequently the sensor coil 4 is selected. Each of the selected sensor coils 3 and 4 carries out a detecting signal transmitting operation and a position pointing signal receiving operation in the same manner as described above.

The position pointing signal is received by the sensor coil that transmitted a detecting signal. The position pointing signal received by the sensor coil is amplified by the amplifier circuit 46 and is detected by the detector circuit 47. High-frequency noise in the position pointing signal detected by the detector circuit 47 is removed by the low-pass filter 48. The position pointing signal is then amplified by the integration amplifier 49 and is converted to a digital signal by the A/D converter circuit 50. The converted signal is input to the CPU 51. Thus, the CPU 51 can detect a signal level of the position pointing signal, which is received from the position pointer 500 by the sensor coil that transmitted the detecting signal to the position pointer 500. To determine a tentative position pointed by the position pointer 500, the CPU 51 computes the XY coordinates of a position which exhibits the peak reception signal level using a method such as parabolic approximation and signal levels exhibited by the four sensor coils 2 to 5, which are arranged at middle positions between the sensor coils 1 and 6.

The sensor coils 1 and 6 located at either side of the sensor coils 2 to 5 are provided for preparatory use only. The sensor coils 1 to 6 are used when the four middle sensor coils 2 to 5 cannot detect the position pointed by the position pointer 500 due to, for example, a rapid movement of the position pointer 500. In a normal position detecting operation, the CPU 51 does not use the sensor coils 1 and 6 to compute the position pointed by the position pointer 500. If the CPU 51 cannot detect the position pointed by the position pointer 500 from the signal levels detected by the four middle sensor coils 2 to 5 due to, for example, a rapid movement of the position pointer 500, the CPU 51 computes the peak level of reception signals by using a method such as parabolic approximation and either by using signal levels detected by the outermost sensor coils 1 and 6 and the middlemost sensor coils 3 and 4 or by using, if required, signal levels detected by the outermost sensor coils 1 and 6 and the middle sensor coils 2 and 5. The CPU 51 then computes the coordinates of the position of the peak level as the tentative position pointed by the position pointer.

Figure 7:
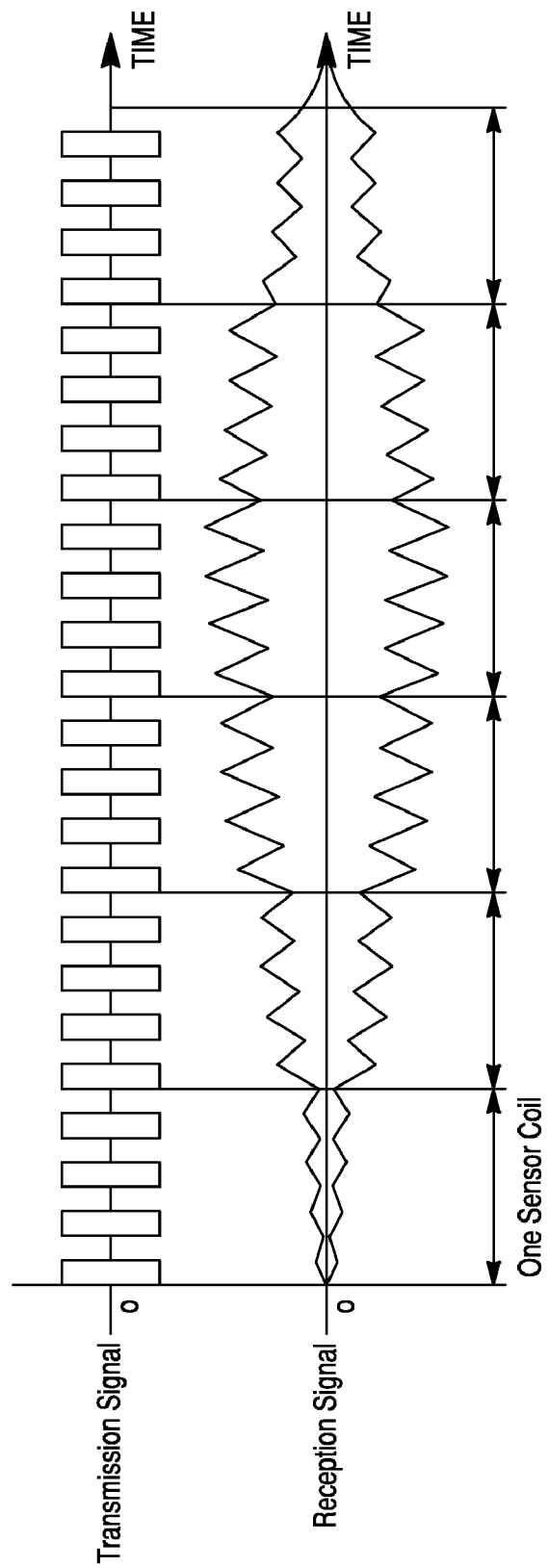
FIG. 7 is a timing diagram illustrating the operation of a known position detecting device.

When selecting and driving each of the sensor coils 1 to 6 in the above-described manner, each sensor coil is scanned three times, as shown in FIG. 3. The sum or average of the three detected signals is considered to be the detection signal level output from each sensor coil. As shown in FIG. 7, the known position detecting device detects a position pointed by the position pointer 500 by transmitting and receiving a signal four times in a predetermined time period. Accordingly, a residual signal used for the previous detecting operation is accumulated, thus generating a detection error. In this embodiment, a pause time during which a position pointing signal from the position pointer 500 disappears is provided during an operation selecting one sensor coil from another sensor coil. Thus, after the signal detection of the selected sensor coil is completely terminated and a position pointing signal from the position pointer 500 disappears, the subsequently selected sensor coil carries out transmission and reception operations of a signal. As described above, the interval between signal detecting operations of the sensor coils is determined to be more than a predetermined time period so that no residual signal of a signal detection operation of each sensor coil remains. Consequently, the occurrence of a detection error due to a residual signal can be reduced. This operation is also applied to the cases described below.

In a selection pattern B for a second group, like the selection pattern A, each of the sensor coils 1 and 6, which are located at either side of the remaining sensor coils 2 to 5 in the group, is selected in a predetermined order prior to the sensor coils 2 to 5, which are located between the sensor coils 1 and 6. In a transmission mode, each of the selected sensor coils 1 and 6 transmits a detecting signal to the position pointer 500. In a reception mode, each of the selected sensor coils 1 and 6, which transmitted the detecting signal in the transmission mode, receives a position pointing signal from the position pointer 500 using electromagnetic coupling.

In the subsequent operation for selecting a sensor coil, the sensor coils 2 and 5, which are located at either side of the sensor coils 3 to 4, are selected in an order different from that defined in the selection pattern A. That is, the sensor coil 5 is selected first, and subsequently the sensor coil 2 is selected. Each of the selected sensor coils 2 and 5 carries out a detecting signal transmitting operation and a position pointing signal receiving operation in the same manner as described above.

In the subsequent operation for selecting a sensor coil, the sensor coils 3 and 4, which are located between 2 and 5, are selected in the same order as that defined in the selection pattern A. That is, the sensor coil 3 is selected first, and subsequently the sensor coil 4 is selected. Each of the selected sensor coils 3 and 4 carries out a detecting signal transmitting operation and a position pointing signal receiving operation in the same manner as described above.

Thus, using signals received by the sensor coils 1 to 6, a tentative position pointed by the position pointer 500 is computed in the same manner as described above.

In a selection pattern C for a third group, like the selection pattern A, each of the sensor coils 1 and 6, which are located at either side of the remaining sensor coils 2 to 5 in the group, is selected in a predetermined order prior to the sensor coils 2 to 5, which are located between the sensor coils 1 and 6. In a transmission mode, each of the selected sensor coils 1 and 6 transmits a detecting signal to the position pointer 500. In a reception mode, each of the selected sensor coils 1 and 6, which transmitted the detecting signal in the transmission mode, receives a position pointing signal from the position pointer 500 using electromagnetic coupling.

In the subsequent operation for selecting a sensor coil, the sensor coils 2 and 5, which are located at either side of the sensor coils 3 to 4, are selected in an order different from that defined in the selection pattern A. That is, the sensor coil 2 is selected first, and subsequently the sensor coil 5 is selected. Each of the selected sensor coils 2 and 5 carries out a detecting signal transmitting operation and a position pointing signal receiving operation in the same manner as described above.

In the subsequent operation for selecting a sensor coil, the sensor coils 3 and 4, which are arranged between 2 and 5, are selected in an order different from that defined in the selection pattern A. That is, the sensor coil 4 is selected first, and subsequently the sensor coil 3 is selected. Each of the selected sensor coils 3 and 4 carries out a detecting signal transmitting operation and a position pointing signal receiving operation in the same manner as described above.

Thus, using signals received by the sensor coils 1 to 6, a tentative position pointed by the position pointer 500 is computed in the same manner as described above.

In a selection pattern D for a fourth group, like the selection pattern A, the sensor coils 1 and 6, which are located at either side of the remaining sensor coils 2 to 5 in the group, are selected in a predetermined order prior to the sensor coils 2 to 5, which are located between the sensor coils 1 and 6. In a transmission mode, each of the selected sensor coils 1 and 6 transmits a detecting signal to the position pointer 500. In a reception mode, each of the selected sensor coils 1 and 6, which transmitted the detecting signal in the transmission mode, receives a position pointing signal from the position pointer 500 using electromagnetic coupling.

In the subsequent operation for selecting a sensor coil, the sensor coils 2 and 5, which are located at either side of the sensor coils 3 to 4, are selected in an order different from that defined in the selection pattern A. That is, the sensor coil 5 is selected first, and subsequently the sensor coil 2 is selected. Each of the selected sensor coils 2 and 5 carries out a detecting signal transmitting operation and a position pointing signal receiving operation in the same manner as described above.

In the subsequent operation for selecting a sensor coil, each of the sensor coils 3 and 4, which are located between 2 and 5, is selected in an order different from that defined in the selection pattern A. That is, the sensor coil 4 is selected first, and subsequently the sensor coil 3 is selected. Each of the selected sensor coils 3 and 4 carries out a detecting signal transmitting operation and a position pointing signal receiving operation in the same manner as described above.

Thus, using signals received by the sensor coils 1 to 6, a tentative position pointed by the position pointer 500 is computed in the same manner as described above.

The above-described operations are alternately carried out for the X-axis sensor coils and for the Y-axis sensor coils. The above-described plural selection patterns A to D form one cycle. By repeating the cycle, a tentative position pointed by the position pointer 500 is detected from each of the selection patterns.

The CPU 51 computes a final position pointed by the position pointer 500 by obtaining a moving average of a predetermined number (e.g., eight) of the tentative positions detected from the selection patterns. Consequently, the occurrence of a detection error due to high-frequency noise caused by the body of an electronic apparatus can be reduced, and therefore, more precise detection of the coordinates can be provided.

Figure 8:
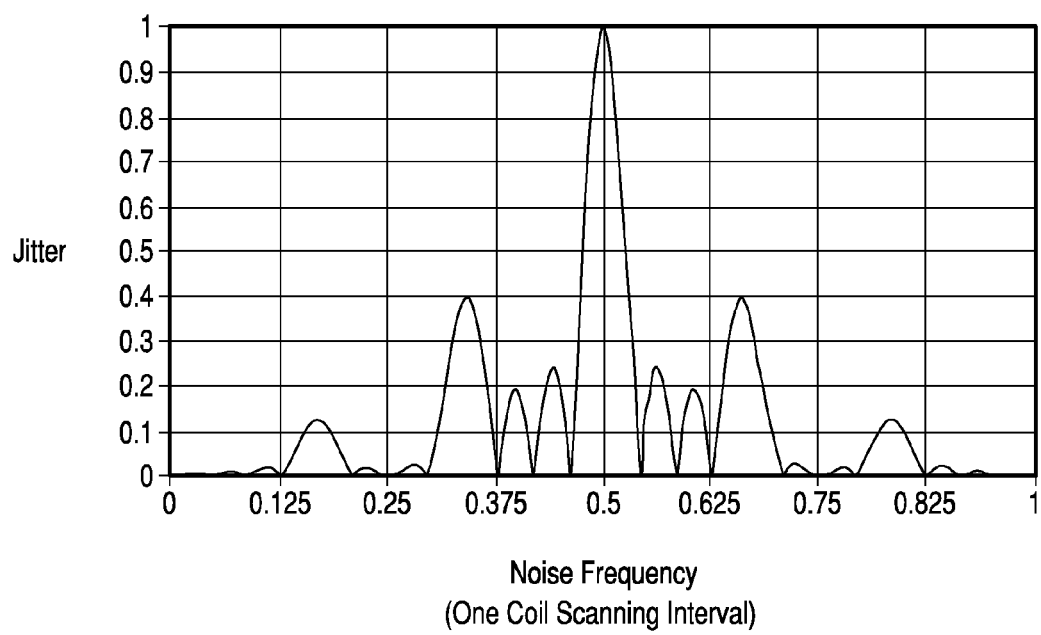
FIG. 8 is a graph illustrating a noise frequency characteristic of a known position detecting device.

As can be seen from a jitter frequency characteristic shown in FIG. 4, when the unit interval of a sensor-coil scanning frequency is a reciprocal number 1/Ts of scanning time Ts for scanning two coils of the position detecting device (one coil depending on a computing method of the coordinates of the position pointer 500), a large low-frequency jitter is reduced for noise at positions of a frequency distant from a sensor-coil scanning frequency f0 by ±0.5 frequencies, that is, at positions of f0±0.5/Ts, compared with the frequency characteristic shown in FIG. 8. The reduction of influence of the noise reduces the occurrence of a detection error of the position pointed by the position pointer 500.

Figure 6:
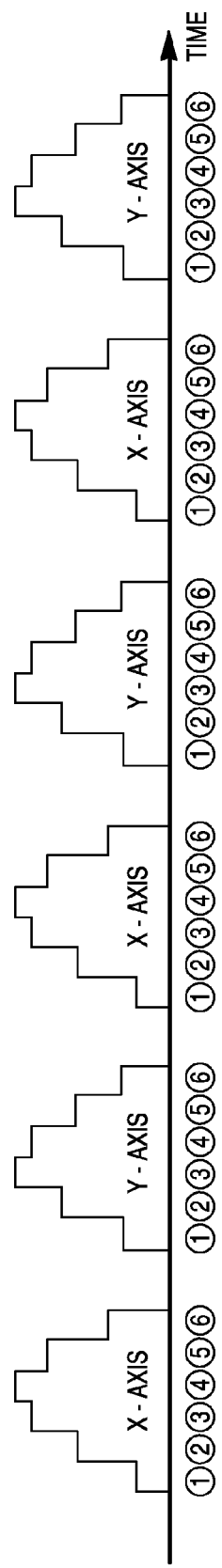
FIG. 6 is a timing diagram illustrating the operation of a known position detecting device.

As shown in FIG. 6, the known position detecting device sequentially selects and drives each of the sensor coils 1 to 6. Since the detection signal level of each sensor coil significantly rises or falls as time elapses, there is a possibility of the detection signal level not reaching the proper signal level in a short time. However, as shown in FIG. 2, by selecting each sensor coil as in the present embodiment, the difference between the detection signal levels of the sensor coils can be reduced. Accordingly, the detection signal level reaches the proper signal level in a short time. As a result, the occurrence of a detection error can be reduced, and therefore, precise position detection can be provided.

As described above, according to the first embodiment of the present invention, a position detecting device includes a plurality of sensor coils X1 to X40 and Y1 to Y40 arranged in a predetermined order to receive signals from a position pointer; reception device (the selection circuit 42, the transmission/reception switching circuit 45, and the CPU 51) for extracting a predetermined number of the plurality of sensor coils 1 to 6 from among the pluralities of sensor coils X1 to X40 and Y1 to Y40 in an order of the arrangement to form a group and for receiving a signal using electromagnetic coupling from the position pointer with each of the sensor coils 1 to 6 in the group selected in a predetermined order; and detection device (the CPU 51 and the level detection circuit 52) for detecting a position pointed by the position pointer on the basis of position pointing signals received from the selected sensor coils. The reception device sequentially forms a plurality of groups in which the selection order of the extracted sensor coils 1 to 6 is different from each other. The position pointing signal is received by a sensor coil selected in a predetermined order for each group using electromagnetic coupling. The detection device detects the position pointed by the position pointer on the basis of position pointing signals received from the selected sensor coils.

Here, in the sector scanning mode, the sensor coils extracted from among the plurality of sensor coils X1 to X40 and Y1 to Y40 are a predetermined number of the plurality of sensor coils arranged in the vicinity of a position pointed by the position pointer 500. In the global scanning mode, the sensor coils extracted from among the plurality of sensor coils X1 to X40 and Y1 to Y40 are all of the sensor coils in one of directions of the axes or in directions of the both axes.

Additionally, the reception device receives a signal from the position pointer using electromagnetic coupling by selecting sensor coils located at either side of the middle sensors in each group prior to selecting each of the middle sensors. That is, the reception device selects the sensor coils 1 and 6, which are located at either side of the other sensor coils in the group, prior to the sensor coils 2 to 5, which are located between the sensor coils 1 and 6. If the preparatory sensor coils 1 and 6 are not used, the sensor coils 2 and 5 correspond to sensor coils located at either side of the other sensor coils in the group. Thus, the reception device selects the sensor coils 2 and 5 prior to the sensor coils 3 to 4, which are located between the sensor coils 2 and 5.

Additionally, the reception device selects each of the sensor coils between the sensor coils 1 to 6 of the group while changing an order of selecting a sensor coil in a predetermined manner for each group so that the order of selecting a sensor coil is different for each group. The selected sensor coil then receives a signal from the position pointer using electromagnetic coupling. The reception device also determines the set of the plurality of groups to be one cycle and repeats the reception according to the cycle.

In addition, the reception device includes transmission device for delivering a position detecting signal for detecting a position pointed by the position pointer to the sensor coil in order to transmit the position detecting signal from the sensor coil to the position pointer using electromagnetic coupling. The transmission device selects the same sensor coil as that selected by the reception device and delivers the position detecting signal to that sensor coil.

Additionally, the position detecting device includes transmission device for delivering a position detecting signal for detecting a position pointed by the position pointer to the sensor coil in order to transmit the position detecting signal from the sensor coil to the position pointer using electromagnetic coupling or electrostatic coupling. The transmission device selects the sensor coil closest to the position pointer in each group and delivers the position detecting signal to that sensor coil.

Consequently, the influence of noise that causes low-frequency jitter can be reduced, and therefore, highly precise detection of the position can be provided.

Furthermore, the detection device detects tentative positions pointed by the position pointer on the basis of signals received by the sensor coils in each group and determines the moving average of a predetermined number of the tentative positions pointed by the position pointer to be the position pointed by the position pointer. Consequently, when the unit frequency of a sensor-coil scanning frequency is a reciprocal number 1/Ts of scanning time Ts for scanning two coils (one coil depending on a computing method of the coordinates of the position pointer), a high-frequency jitter is reduced for noise distributed at positions excluding positions of a frequency distant from a sensor-coil scanning frequency f0 by ±0.5 frequencies, that is, at positions excluding positions of f0±0.5/Ts. Since the influence of the high-frequency jitter is reduced, highly precise detection of the position can be provided.

While the present embodiment has been described with reference to a position detecting device using an electromagnetic coupling method in which transmission and reception of a signal between a position pointer and a position detecting device is carried out via electromagnetic coupling, the present embodiment can be applied to a position detecting device using an electrostatic coupling method in which transmission and reception of a signal between a position pointer and a position detecting device is carried out via electrostatic coupling, since the present embodiment is effective for reducing periodic electrostatic noise (e.g., noise caused by a liquid crystal display device or a backlight). Additionally, the following embodiments can be applied to a position detecting device using an electrostatic coupling method as well as a position detecting device using an electromagnetic coupling method.

A position detecting device according to a second embodiment of the present invention is described next. FIG. 5B is a diagram schematically illustrating the operation of the position detecting device according to the second embodiment. In FIG. 5B, identical elements to those illustrated and described in relation to FIG. 5A are designated by identical reference numerals.

A block diagram and timing diagrams of the second embodiment are identical to the block diagram of the first embodiment shown in FIG. 1 and the timing diagrams of the first embodiment shown in FIGS. 2 and 3. Only the driving method of a plurality of sensor coils a to c in a group is different. In the first embodiment, the sensor coils in a group is sequentially selected and driven in a predetermined order, and a sensor coil that transmitted a position detecting signal receives a position pointing signal from the position pointer 500. The second embodiment differs from the first embodiment in that a sensor coil b located at the position closest to the position pointer 500 transmits a position pointing signal to the position pointer 500 using electromagnetic coupling, and the position detecting device sequentially selects and drives each sensor coil in a group in a predetermined order and at a predetermined timing (in an order and at a timing shown in FIGS. 2 and 3) to receive a position pointing signal from the position pointer 500 using electromagnetic coupling.

That is, in the second embodiment, to carry out sector scanning, the sensor coil b located at a position closest to the position pointer 500 in each group is selected. By delivering a position detecting signal to the selected sensor coil b, the position detecting signal is transmitted to the position pointer 500 using electromagnetic coupling. At the same time, by selecting and driving each of sensor coils a to c in the group in a predetermined order shown in FIG. 2, a position pointing signal is received by the selected sensor coil (see (1) through (3) in FIG. 5B).

Thus, position pointing signals are sequentially received by the selected and driven sensor coils in the same order as that in the first embodiment. Subsequently, the position of the position pointer 500 can be detected in the same manner as in the first embodiment. Like the first embodiment, the second embodiment can provide the characteristic identical to that shown in FIG. 4. Consequently, the influence of noise that causes low-frequency jitter can be reduced, and therefore, highly precise detection of the position can be provided.

A position detecting device according to a third embodiment of the present invention is described next.

FIG. 5C is a diagram schematically illustrating the operation of the position detecting device according to the third embodiment. In FIG. 5C, identical elements to those illustrated and described in relation to FIGS. 5A and 5B are designated by identical reference numerals.

A block diagram and timing diagrams of the third embodiment are identical to the block diagram of the first embodiment shown in FIG. 1 and the timing diagrams of the first embodiment shown in FIGS. 2 and 3. Only the driving method of a plurality of sensor coils a to c in a group and the reception method are different. In the first embodiment, the sensor coils in a group is sequentially selected and driven in a predetermined order, and a sensor coil that transmitted a position detecting signal receives a position pointing signal from the position pointer 500. The third embodiment differs from the first embodiment in that each of the plurality of sensor coils a to c is sequentially selected and driven (in the order and at timing shown in FIGS. 2 and 3), the selected sensor coils sequentially transmit a position detecting signal to the position pointer 500 using electromagnetic coupling by delivering the position detecting signals to the selected sensor coils, and a sensor coil b located at a position closest to the position pointer 500 receives, from the position pointer 500, a position pointing signal in response to the position detecting signal transmitted from each sensor coil using electromagnetic coupling.

That is, in the third embodiment, to carry out sector scanning, the sensor coils a to c in each group are sequentially selected and driven in the same order as that shown in FIG. 2. By delivering a position detecting signal to the sequentially selected sensor coil, the selected sensor coil transmits a position detecting signal to the position pointer 500 using electromagnetic coupling. The sensor coil b located at a position closest to the position pointer 500 receives position pointing signals corresponding to the position detecting signals transmitted from the sensor coils a to c using electromagnetic coupling (see (1) through (3) in FIG. 5C).

Thus, the position pointing signals are sequentially received by sensor coil b located at a position closest to the position pointer 500 in the same order as that in the first embodiment. Subsequently, the position of the position pointer 500 can be detected in the same manner as in the first embodiment. In addition, in the third embodiment, each sensor coil (each sensor coil in the sensor coil set 41 shown in FIG. 1) functions as a transmission unit for transmitting a position detecting signal. Also, each sensor coil (each sensor coil in the sensor coil set 41 shown in FIG. 1) functions as a reception unit for receiving a position pointing signal.

As described above, according to the third embodiment of the present invention, a position detecting device includes a plurality of transmission units arranged in a predetermined order for transmitting position detecting signals to a position pointer using electromagnetic coupling or electrostatic coupling; transmission device for extracting a predetermined number of the plurality of transmission units from among the plurality of transmission units in an order of the arrangement to form a group and for delivering a position detecting signal to a transmission unit selected from among the transmission units in the group in a predetermined order so as to transmit the position detecting signal to the position pointer; reception device for receiving a position pointing signal from the position pointer using electromagnetic coupling or electrostatic coupling; and detection device for detecting a position pointed by the position pointer on the basis of the position pointing signal received from the reception device. The transmission device sequentially forms a plurality of groups in which the order of selecting the extracted transmission units is different from each other and transmits the position detecting signal to a transmission unit selected in the selection order for each group.

Furthermore, the transmission device selects transmission units located at either side of the middle transmission units in each group prior to selecting each of the middle transmission units and delivers position detecting signals. Also, the transmission device selects each of the middle transmission units while changing an order of selecting a transmission unit in a predetermined manner for each group so that the order of selecting a transmission unit is different for each group. The transmission device then delivers the position detecting signal to the selected transmission unit. The transmission device also determines the set of the plurality of groups to be one cycle and repeats the transmission according to the cycle.

Furthermore, the detection device detects tentative positions pointed by the position pointer on the basis of signals from the position pointer in response to the position detecting signals transmitted from a transmission unit in each group. The detection device then determines the moving average of a predetermined number of the tentative positions pointed by the position pointer to be the position pointed by the position pointer. Additionally, the reception device selects a transmission unit located at a position closest to the position pointer in each group and receives position pointing signals from the position pointer using that transmission unit.

Consequently, the third embodiment can also provide the characteristic identical to that shown in FIG. 4. The influence of noise that causes low-frequency jitter can be reduced, and therefore, highly precise detection of the position can be provided.

In this embodiment, the sensor coil set 41 carries out reception and transmission processes. The present invention can be applied to a position detecting device having another configuration. For example, a position detecting device may include a coil or a sensor dedicated/for transmission and a plurality of sensor coils dedicated for reception and arranged in an XY matrix. The position detecting device causes the coil dedicated for transmission to transmit a position detecting signal to a position pointer, and selects and drives the sensor coils dedicated for reception in the above-described manner to detect a position pointed by the position pointer on the basis of signals received by the sensor coils.

Additionally, in the cases shown in FIGS. 5B and 5C, the axis of sensors for transmission may be different from the axis of sensors for reception. For example, X-axis sensor coils may carry out transmission whereas Y-axis sensor coils may carry out reception. Alternatively, Y-axis sensor coils may carry out transmission whereas X-axis sensor coils may carry out reception.

The present invention can be applied to a position detecting device in which a plurality of transmission coils for transmitting a signal is arranged in a matrix, the transmission coils sequentially transmit a signal to a position pointer having a coil using electromagnetic coupling, the position pointer detects the signal from the coil using electromagnetic coupling, and a position pointed by the position pointer is detected on the basis of the signal detected by the position pointer.

In this embodiment, tentative pointed positions are computed for selection patterns of the groups and a proper position pointed by the position pointer is computed by obtaining the moving average of a predetermined number of the tentative pointed positions. However, the tentative pointed positions in the groups may be determined to be proper positions pointed by the position pointer without computing the moving average.

In addition, while the present embodiment has been described with reference to four groups including a plurality of selected sensors and one cycle formed by the four groups, the number of groups is not intended to be limited to four. Also, the groups do not necessarily form a cycle.

Furthermore, while the present embodiment has been described with reference to a group including six sensor coils, the number of sensor coils in a group is only required to be plural.

As described above, according to an embodiment of the present invention, a position detecting device includes a position pointer, a plurality of sensors arranged in a direction of detecting a position, reception device for receiving a signal including positional information about the position pointer using the sensors via electromagnetic coupling or electrostatic coupling, and detection device for detecting a position pointed by the position pointer from the received signal. The reception device extracts a predetermined number of sensors from among the plurality of sensors to form each of a plurality of groups and defines a unique order of-selecting a sensor to be scanned for each group. The order of selecting the sensors in a group to be scanned is different from that in the immediately previously scanned group.

According to an embodiment of the present invention, a position detecting device includes a plurality of sensors arranged in a predetermined order for receiving a signal from a position pointer; reception device for extracting a predetermined number of the plurality of sensors from among the plurality of sensors in an order of the arrangement to form each of a plurality of groups and receiving the signal from the position pointer using the sensors selected in a predetermined order from among the sensors in the group via electromagnetic coupling or electrostatic coupling; and detection device for detecting a position pointed by the position pointer on the basis of the signals received by the selected sensors. The reception device sequentially forms a plurality of groups in which an order of selecting the extracted sensors is different from each other, and receives the signal from the position pointer for each group using the sensors selected according to the order defined for each group via electromagnetic coupling or electrostatic coupling. The detection device detects a position pointed by the position pointer on the basis of the signals received by the selected sensors.

According to an embodiment of the present invention, a position detecting device includes a position pointer; a plurality of transmission units arranged in a direction of detecting a position; transmission device for transmitting a signal including positional information about the position pointer using the sensors via electromagnetic coupling or electrostatic coupling; reception device for receiving a signal in response to the transmission; and detection device for detecting a position pointed by the position pointer from the received signal. The transmission device extracts a predetermined number of transmission units from among the plurality of transmission units in an order of the arrangement thereof to form each of a plurality of groups and defines a unique order of selecting a transmission unit to be scanned for each group. The order of selecting the transmission units in a group to be scanned is different from that in the immediately previously scanned group.

According to an embodiment of the present invention, a position detecting device includes a plurality of transmission units arranged in a predetermined order for transmitting a position detecting signal to a position pointer using electromagnetic coupling or electrostatic coupling; transmission device for extracting a predetermined number of plural transmission units in the order of the arrangement thereof from among the plurality of transmission units to form each of a plurality of groups and delivering a position detecting signal to the transmission unit selected in a predetermined order from among the transmission units in each group in order to transmit the position detecting signal to the position pointer; reception device for receiving a position pointing signal from the position pointer using electromagnetic coupling or electrostatic coupling; and detection device for detecting a position pointed by the position pointer on the basis of the signal received by the reception device. The transmission device sequentially forms a plurality of groups in which an order of selecting the extracted transmission units is different from each other, and delivers the position detecting signal to the transmission unit in each group selected according to the order defined for each group. Accordingly, a position detecting device having a superior noise characteristic can be provided.

In the above-described position detecting devices, a plurality of sensors is divided into a group. However, the same advantages can be obtained by simply changing the order of scanning the sensors without forming a group.

In this case, a position detecting device includes a position pointer, a plurality of sensors arranged in a direction of detecting a position, reception device for receiving a position pointed by the position pointer using the sensors via electromagnetic coupling or electrostatic coupling, and detection device for detecting the position pointed by the position pointer from the received signal. The reception device defines a unique scanning scheme in which sensors are selected in a predetermined order from among the plurality of sensors. The order of selecting the sensors in a scanning scheme is different from that in the immediately previously used scanning scheme. Thus, the noise characteristic can be improved.

The present invention can be applied to a position detecting device that detects at least a position of a position pointer and the position pointer used by the position detecting device. For example, the present invention can be applied to a position detecting device and a position pointer used by the position detecting device using electromagnetic coupling or electrostatic coupling, which are used as an input unit of a computer aided design (CAD) terminal, a computer, a cell phone, a personal handyphone system (PHS), or a personal digital assistant (PDA). Additionally, the present invention can be applied to a position detecting device that detects not only the position of a position pointer but also the posture of the position pointer.

What is claimed is:

1. A position detecting device, comprising: a position pointer; a plurality of sensors arranged in a direction of detecting a position; reception means for receiving a position pointed by the position pointer using the sensors via electromagnetic coupling or electrostatic coupling; and detection means for detecting the position pointed by the position pointer from the received signal; wherein the reception means extracts a predetermined number of sensors from among the plurality of sensors to form each of a plurality of groups and defines a unique order of selecting a sensor to be scanned for each group and wherein the order of selecting a sensor in a group to be scanned is different from the order given by the spatial arrangement of the sensors and that of an immediately previously scanned group, a transmission means for delivering a position detecting signal to the sensor so as to cause the sensor to transmit a position detecting signal for detecting a position pointed by the position pointer to the position pointer via electromagnetic coupling or electrostatic coupling; wherein the transmission means selects a sensor located at a position closest to the position pointer in a group where the position pointer is located and delivers the position detecting signal only to the selected sensor.

2. The position detecting device according to claim 1, wherein the reception means selects sensors located at either side of remaining sensors in each group prior to middle sensors located between two end sensors and receives a signal from the position pointer via electromagnetic coupling or electrostatic coupling.

3. The position detecting device according to claim 2, wherein the reception means changes an order of selecting the middle sensors in each group in a predetermined manner so that the order of selecting the sensor is different for each group and receives a signal from the position pointer using a selected sensor via electromagnetic coupling or electrostatic coupling.

4. The position detecting device according to claim 1, wherein the reception means repeats a cycle of a set formed from a plurality of the groups each having a different order of selecting a sensor in the group.

5. The position detecting device according to claim 1, wherein the detection means detects tentative positions pointed by the position pointer on the basis of signals received by the sensors in each group and determines a moving average of a predetermined number of the tentative positions to be the position pointed by the position pointer.

6. The position detecting device according to claim 1, further comprising: transmission means for delivering a position detecting signal to the sensors so as to cause the sensors to transmit a position detecting signal for detecting a position pointed by the position pointer to the position pointer via electromagnetic coupling or electrostatic coupling; wherein the transmission means selects a same sensor as a reception sensor selected by the reception means and delivers the position detecting signal to the selected sensor.

7. A position detecting device comprising: a position pointer; a plurality of transmission units arranged in a direction of detecting a position; transmission means for transmitting a position pointed by the position pointer using the transmission units via electromagnetic coupling or electrostatic coupling; reception means for receiving signals transmitted from the transmission units; and detection means for detecting the position pointed by the position pointer from the received signal; wherein the transmission means extracts a predetermined number of transmission units from among the plurality of transmission units in an order of the arrangement thereof to form each of a plurality of groups and defines a unique order of selecting a transmission unit to be scanned for each group and wherein the order of selecting the transmission units in a group to be scanned is different from the order given by the spatial arrangement of the transmission units and that in an immediately previously scanned group, wherein the reception means selects a transmission unit located at a position closest to the position pointer in a group where the position pointer is located and receives the position pointing signal from the position pointer using only the selected transmission unit.

8. The position detecting device according to claim 7, wherein the transmission means selects transmission units located at either side of remaining transmission units in each group prior to middle transmission units located between two end transmission units and delivers a position detecting signal to the selected transmission unit.

9. The position detecting device according to claim 8, wherein the transmission means changes an order of selecting the middle transmission units in each group in a predetermined manner so that the order of selecting the transmission unit is different for each group and delivers the position detecting signal to the selected transmission unit.

10. The position detecting device according to claim 7, wherein the transmission means repeats a cycle of a set formed from a plurality of the groups each having a different order of selecting a transmission unit in the group.

11. The position detecting device according to claim 7, wherein the detection means detects tentative positions pointed by the position pointer on the basis of signals from the position pointer in response to position detecting signals transmitted from the transmission units in each group and determines a moving average of a predetermined number of tentative positions to be the position pointed by the position pointer.

12. A method of operating a position detecting device, comprising: providing a position pointer and a plurality of sensors arranged of detecting a position; receiving a position pointed by the position pointer using sensors via electromagnetic coupling; detecting the position pointed by the position pointer from the received signal; and selecting sensors to be scanned from among the plurality of sensors in a predetermined order, wherein the order of selecting the sensors is different from the order given by the spatial arrangement of the sensors and that of immediately previously scanned sensors, wherein the selected sensors form each of a plurality of groups delivering a position detecting signal to the sensor so as to cause the sensor to transmit a position detecting signal for detecting a position pointed by the position pointer to the position pointer via electromagnetic coupling or electrostatic coupling; selecting a sensor located at a position closest to the position pointer in a group where the position pointer is located; and delivering the position detecting signal only to the selected sensor.

13. The method of claim 12, further comprising: selecting sensors located at either side of remaining sensors in each group prior to middle sensors located between two end sensors; and receiving a signal from the position pointer via electromagnetic coupling or electrostatic coupling.

14. The method of claim 13, further comprising: changing an order of selecting the middle sensors in each group in a predetermined manner so that the order of selecting the sensor is different for each group; and receiving a signal from the position pointer using a selected sensor via electromagnetic coupling or electrostatic coupling.

15. The method of claim 12, further comprising: repeating a cycle of a set formed from a plurality of the groups each having a different order of selecting a sensor in the group.

16. The method of claim 12, further comprising: detecting tentative positions pointed by the position pointer on the basis of signals received by the sensors in each group; and determining a moving average of a predetermined number of the tentative positions to be the position pointed by the position pointer.

17. The method of claim 12, further comprising: delivering a position detecting signal to the sensors so as to cause the sensors to transmit a position detecting signal for detecting a position pointed by the position pointer to The position pointer via electromagnetic coupling or electrostatic coupling; selecting a same sensor as a reception sensor selected by the reception means; and delivering The position detecting signal to the selected sensor.

18. The method of claim 12, wherein the plurality of sensors are a predetermined number of transmission-units.

19. A position detecting device, comprising:
   a position pointer;
   a plurality of sensors arranged in a direction of detecting a position;
   transmission means for delivering a position detecting signal to the sensors so as to cause the sensors to transmit a position detecting signal for detecting a position pointed by the position pointer to the position pointer via electromagnetic coupling or electrostatic coupling;
   reception means for receiving a position pointed by the position pointer using the sensors via electromagnetic coupling or electrostatic coupling;
   and detection means for detecting the position pointed by the position pointer from the received signal;
   wherein the reception means extracts a predetermined number of sensors from among the plurality of sensors to form each of a plurality of groups and defines a unique order of selecting a sensor to be scanned for each group, the order of selecting a sensor in a group to be scanned being different from that in an immediately previously scanned group;
   wherein the reception means selects sensors located at either side of remaining sensors in each group prior to middle sensors located between two end sensors and receives a signal from the position pointer via electromagnetic coupling or electrostatic coupling;
   wherein the reception means changes an order of selecting the middle sensors in each group in a predetermined manner so that the order of selecting the sensor is different for each group, and repeats a cycle of a set formed from a plurality of the groups;
   wherein the detection means detects tentative positions pointed by the position pointer on the basis of signals received by the sensors in each group and determines a moving average of a predetermined number of the tentative positions to be the position pointed by the position pointer, and
   wherein the transmission means selects as a reception sensor at least one of a same sensor selected by the reception means and a sensor located at a position closest to the position pointer in each group and delivers the position detecting signal to the selected sensor.

20. A position detecting device comprising:
   a position pointer;
   a plurality of transmission units arranged in a direction of detecting a position;
   transmission means for transmitting a position pointed by the position pointer using the transmission units via electromagnetic coupling or electrostatic coupling;
   reception means for receiving signals transmitted from the transmission units; and
   detection means for detecting the position pointed by the position pointer from the received signal;
   wherein the transmission means extracts a predetermined number of transmission units from among the plurality of transmission units in an order of the arrangement thereof to form each of a plurality of groups and defines a unique order of selecting a transmission unit to be scanned for each group, the order of selecting the transmission units in a group to be scanned being different from that in an immediately previously scanned group;
   wherein the transmission means selects transmission units located at either side of remaining transmission units in each group prior to middle transmission units located between two end transmission units and delivers a position detecting signal to the selected transmission unit;
   wherein the transmission means changes an order of selecting the middle transmission units in each group in a predetermined manner so that the order of selecting the transmission unit is different for each group and repeats a cycle of a set formed from a plurality of the groups;
   wherein the detection means detects tentative positions pointed by the position pointer on the basis of signals from the position pointer in response to position detecting signals transmitted from the transmission units in each group and determines a moving average of a predetermined number of tentative positions to be the position pointed by the position pointer, and
   wherein the reception means selects a transmission unit located at a position closest to the position pointer in each group and receives the position pointing signal from the position pointer using the selected transmission unit.

21. A method of operating a position detecting device, comprising:
   providing a position pointer and a plurality of sensors arranged of detecting a position;
   receiving a position pointed by the position pointer using sensors via electromagnetic coupling or electrostatic coupling;
   detecting the position pointed by the position pointer from the received signal;
   selecting sensors to be scanned from among the plurality of sensors in a predetermined order, the order of selecting the sensors being different from that of immediately previously scanned sensors and the selected sensors forming each of a plurality of groups;
   selecting sensors located at either side of remaining sensors in each group prior to middle sensors located between two end sensors;
   changing an order of selecting the middle sensors in each group in a predetermined manner so that the order of selecting the sensor is different for each group;
   selecting a same sensor as a reception sensor selected by the reception means, the selected sensor being located at a position closest to the position pointer in each group;
   repeating a cycle of a set formed from a plurality of the groups each having a different order of selecting a sensor in the group;
   delivering a position detecting signal to at least one sensor so as to cause the at least one sensor to transmit a position detecting signal for detecting a position pointed by the position pointer to the position pointer;
   receiving a signal from the position pointer using a selected sensor;
   detecting tentative positions pointed by the position pointer on the basis of signals received by the sensors in each group; and
   determining a moving average of a predetermined number of the tentative positions to be the position pointed by the position pointer.

* * * * *